April 11, 1933. A. KREMMLING 1,903,570
APPARATUS FOR DEPOSITING PLASTIC OR SEMIFLUID SUBSTANCES
Filed Sept. 15, 1932 4 Sheets-Sheet 1
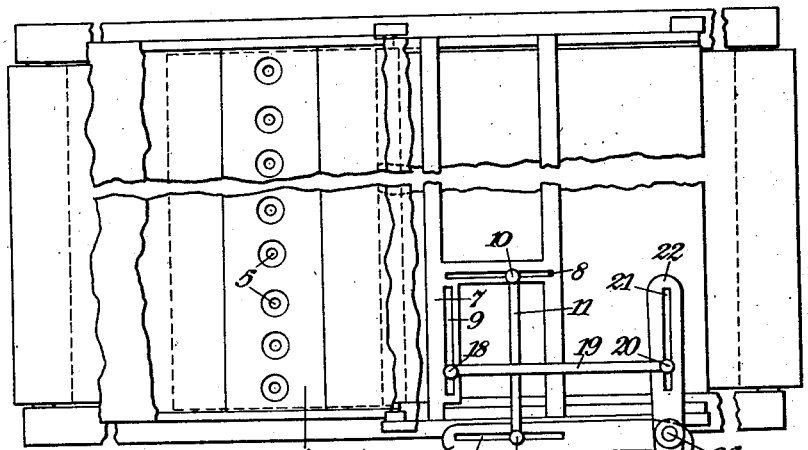
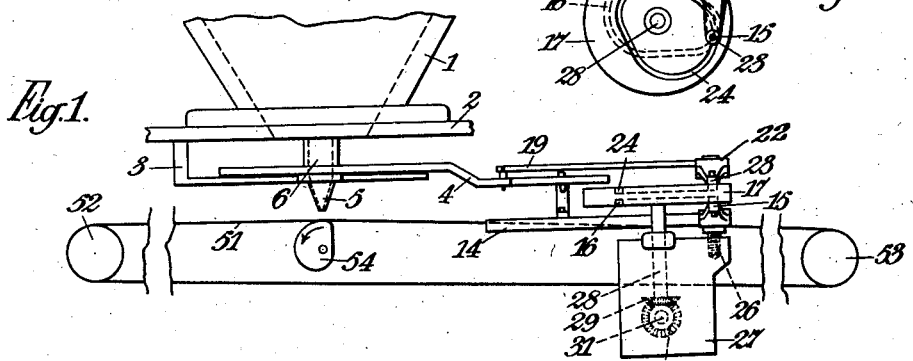
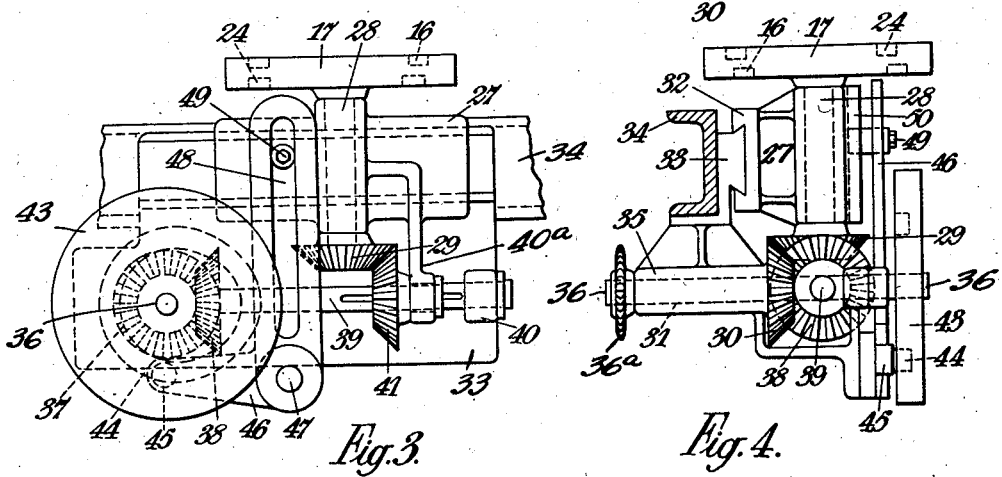
A. Kremmling
INVENTOR
By: Marks & Clerk
Attys.

April 11, 1933. A. KREMMLING 1,903,570
APPARATUS FOR DEPOSITING PLASTIC OR SEMIFLUID SUBSTANCES
Filed Sept. 15, 1932 4 Sheets-Sheet 2
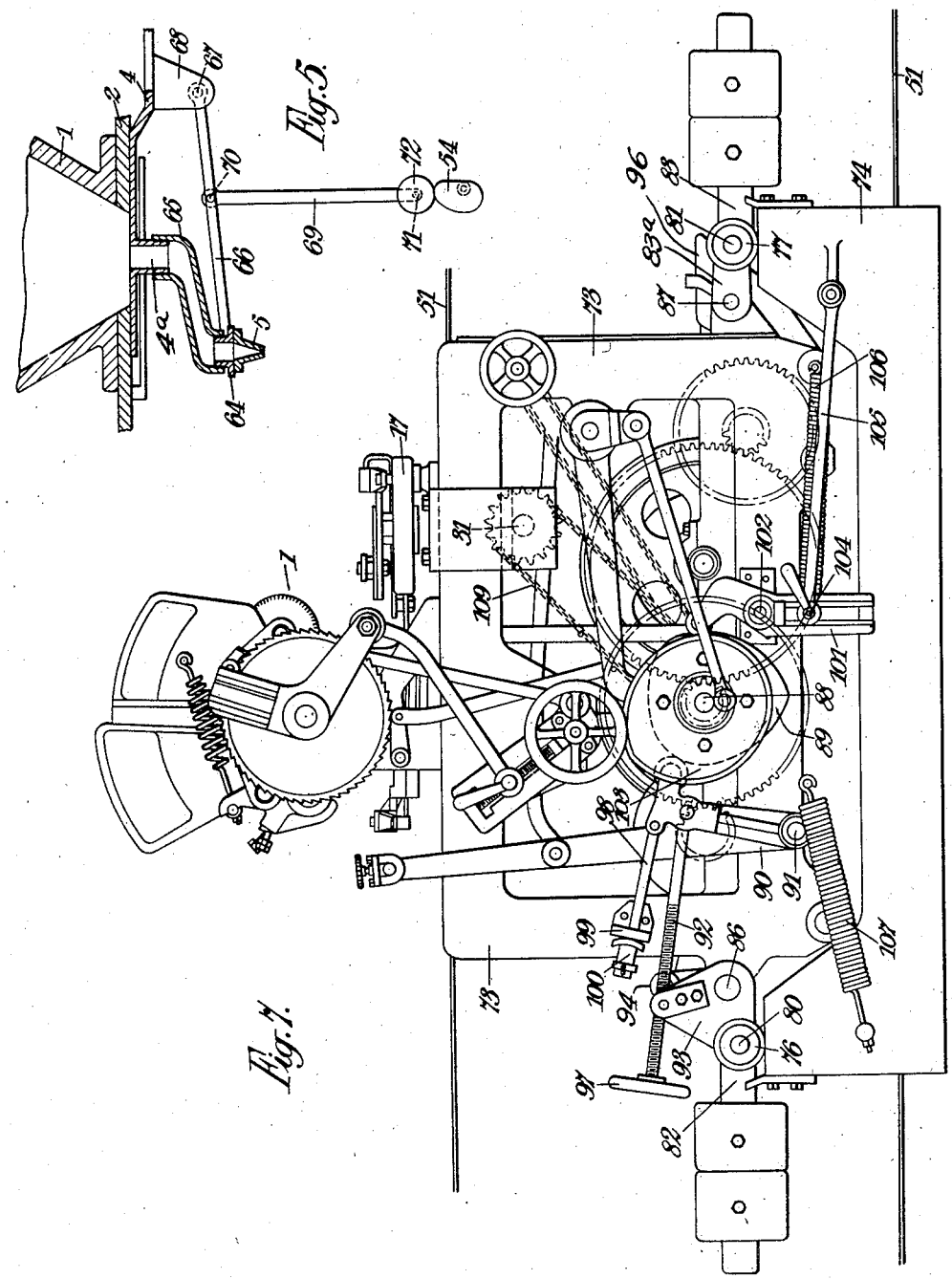

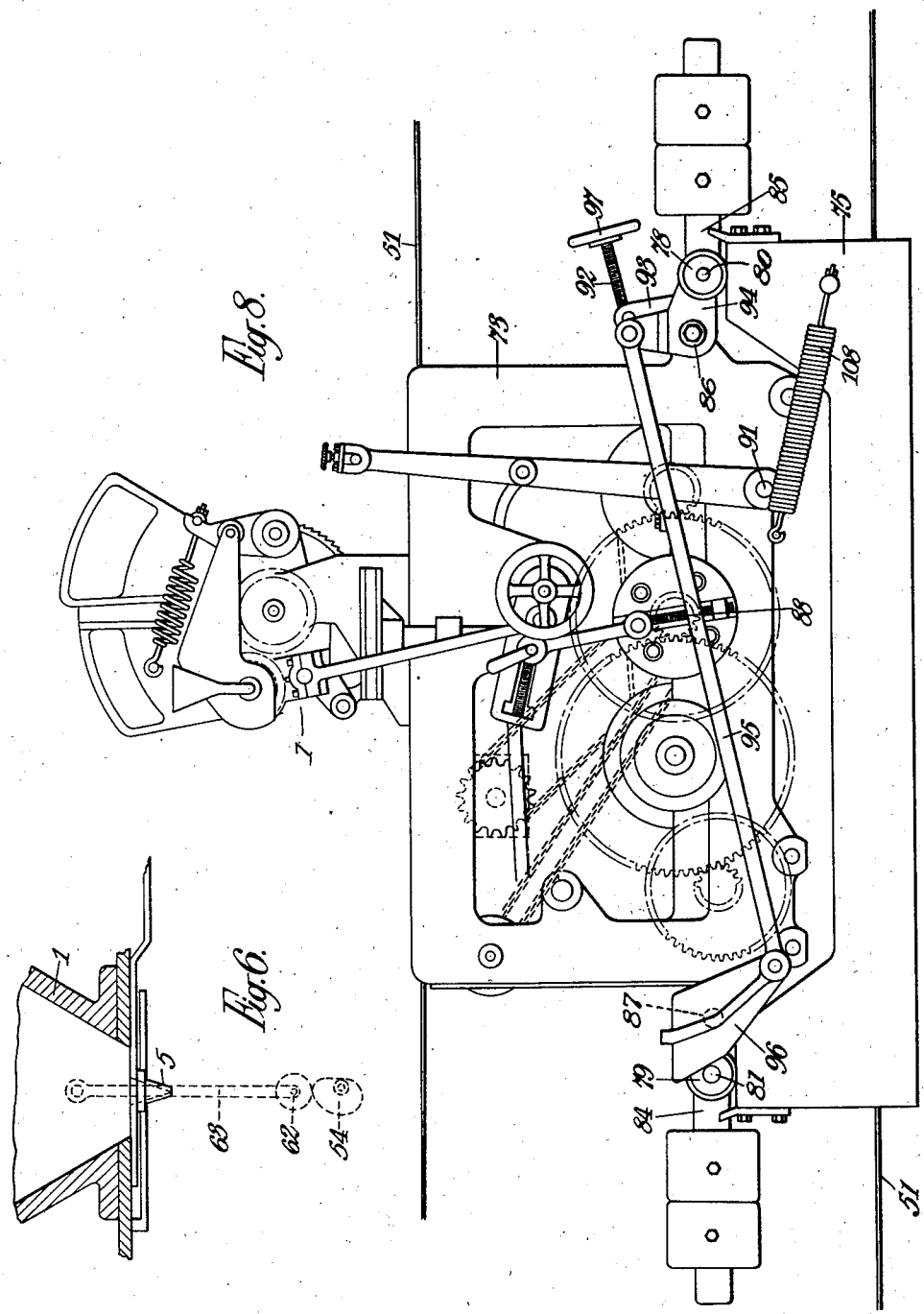

April 11, 1933.  A. KREMMLING  1,903,570
APPARATUS FOR DEPOSITING PLASTIC OR SEMIFLUID SUBSTANCES
Filed Sept. 15, 1932  4 Sheets-Sheet 4

Patented Apr. 11, 1933

1,903,570

UNITED STATES PATENT OFFICE

ARIBERT KREMMLING, OF HAMERSLEBEN NEAR OSCHERSLEBEN, GERMANY

APPARATUS FOR DEPOSITING PLASTIC OR SEMIFLUID SUBSTANCES

Application filed September 15, 1932, Serial No. 633,354, and in Germany July 19, 1930

This invention relates to machines for depositing plastic or semi-fluid substances, such as dough or batter shapes or like confectionery articles by extrusion of the material through a nozzle (or a plurality thereof) and wherein a movement is imparted to the nozzle (or nozzles) in a horizontal plane in accordance with the shape of the article to be produced.

The object of the present invention is to provide an improved machine whereby the deposition of the articles may be effected upon a continuously moving surface such as a conveyor band or travelling trays or the like.

According to the invention in a machine for forming confectionery shapes comprising a depositor having a nozzle (or a plurality thereof) to which a motion is imparted in a horizontal plane in accordance with the shape of the article to be produced, means are provided for controlling the movements of the nozzle in accordance with the forward travel of the receiving surface.

The supplementary movements of the nozzles may be effected by a controlled movement of the depositing machine together with the nozzle. These supplementary movements may be effected by the provision of cam operated means. Alternatively, the means for moving the nozzles in accordance with the shape of the articles to be deposited may have a bodily movement relatively to the depositor hopper in accordance with the movements of the travelling receiving surface.

The supplementary movements also include a vertical movement of the depositing mechanism to move the nozzles vertically with relation to the travelling receiving surface to separate the extruding material from the previously deposited articles. This vertical movement of the depositing mechanism is effected in timed relation to the longitudinal movements of the depositing mechanisms so that the separation or breaking of the extruding material occurs at the completion of the forward movement of the depositing mechanism; the nozzles being returned to their initial position at the commencement of the next forward movement of the depositing mechanism.

Further features of the invention will be hereinafter described.

In the accompanying drawings:—

Figures 1 and 2 diagrammatically illustrate in elevation and plan a depositing device having nozzles which are moved in a horizontal plane to shape the articles through the agency of cam-controlled mechanism.

Figure 3 is an elevation showing a supplementary drive for effecting the additional movement of the nozzles in accordance with the travel of the receiving surface.

Figure 4 is an end elevation corresponding to Figure 3.

Figure 5 shows a sectional elevation of a device for lifting the nozzles to effect a breaking away of the nozzle from the deposited shape.

Figure 6 is a partial elevation of means for lifting the depositor for causing a breaking away of the nozzles from the deposited shape.

Figure 7 is an elevation of a modified machine wherein the supplementary movement is imparted to the nozzles in accordance with the movement of the travelling receiving surface by reciprocating the entire machine.

Figure 8 is an elevation of the machine shown in Figure 7 looking from the other side.

Figure 9:
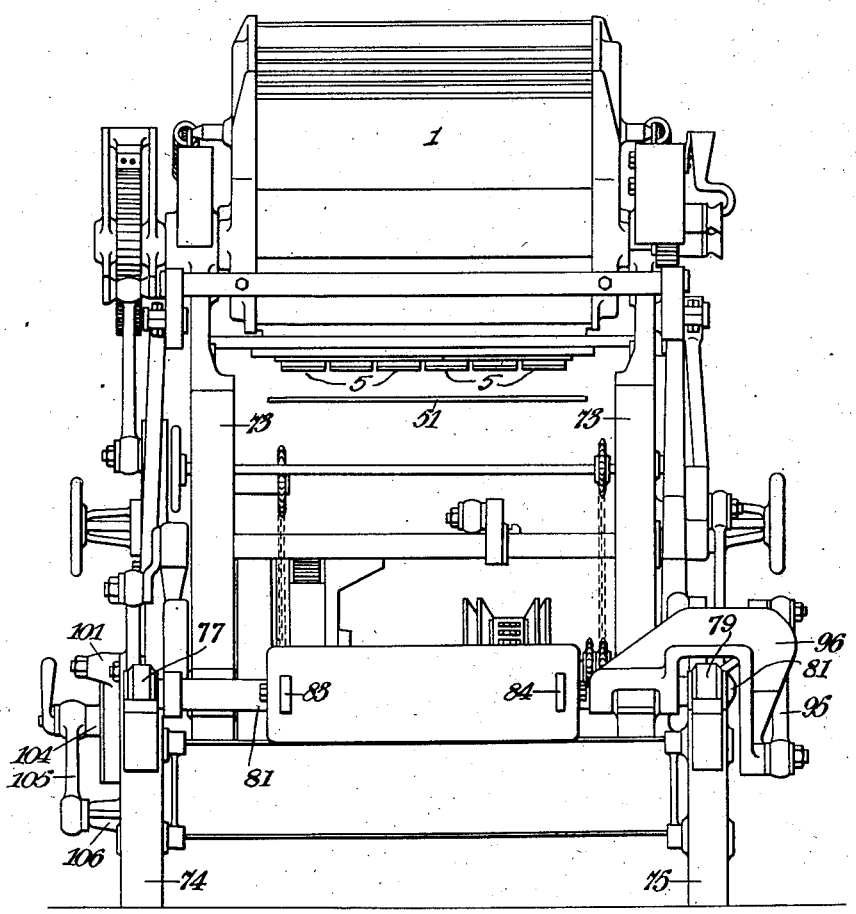
Figure 9 is an end elevation of the machine looking from the left in Figure 8.

In carrying the invention into effect according to one arrangement, a plate 2 is fitted beneath the hopper 1 of a depositing machine of known construction and supports a holder or bracket 3 on which a nozzle plate 4 is movably mounted. The plate 4 carries a series of nozzles 5 which are connected by means of flexible tubes 6 to the apertures in the plate 2, whereby movement of the nozzle plate may be effected relatively to the stationary plate 2.

The nozzle plate 4 is provided with an extension piece 7 in which slots 8 and 9 are formed, the slot 8 being longitudinal of the plate 4 while the slot 9 is transversely arranged thereof.

One end of a connecting link 11 carries a bolt 10 which engages in slot 8 so that it may be adjusted along the slot, the other end of the link 11 having a bolt 12 adapted to engage in a slot 13 of the arm 14 of a bell crank lever, the other end of which is provided with a roller 15 which engages in the lower cam groove 16 of a rotary cam plate 17. A second connecting link 19 is provided, one end of which carries a bolt 18 adapted to engage in the slot 9 so that it may be adjusted along the slot. The other end of the connecting link 19 is provided with a bolt 20 engaging in a slot 21 on a pivoted lever 22, the other arm of which carries a roller 23 engaging in the upper cam groove 24 of the cam disc 17.

The bell crank lever 14 and the lever 22 are both pivoted upon a stub shaft 25, the lower end 26 of which is screwed into a casing or mounting 27. The mounting 27 also carries a vertical driven shaft 28 upon which the cam disc 17 is mounted, the lower end of the shaft 28 having a bevel wheel 29 which meshes with a bevel wheel 30 carried by a driving shaft 31.

The driving shaft 31 may be driven in any convenient manner as, for example, by a chain drive from any convenient moving member.

The cam disc 17 is mounted on the shaft 28 in a removable manner so that it may be interchanged with other discs having differently shaped cam grooves according to the shape of the articles being produced.

It will be appreciated that as the cam disc revolves the levers 14 and 22 will be pivoted in accordance with their respective cam grooves and thus impart motion to the connecting links 11, 19 which motion will be transmitted to the nozzles 5. Thus the lower cam groove 16 will control lateral movements of the nozzles while the upper cam groove 24 will produce longitudinal movement of the nozzles, the resultant of the two movements producing a combined movement of the nozzles in accordance with the shape of the article to be deposited.

By adjusting the connecting link 19 in the slots 9 and 21 the extent of the longitudinal component of the nozzle movements may be varied as desired. Similarly the extent of the transverse component of the nozzles may be varied by an adjustment of the connecting link 11 with respect to the slots 8 and 13. Thus, for example, the lateral component of the movements of the nozzles may be adjusted to a small dimension while the longitudinal component may be made large. Alternatively, the lateral component may be large while the longitudinal movement is small. Further, the two movements may be of similar extent so as to produce circular articles.

For the purpose of depositing the articles on a continuously moving receiving surface comprising, for example an endless conveyor 51 mounted upon rolls 52, 53 one of which is driven in any convenient known manner, the mounting 27 (see Figures 3 and 4) may be arranged in such a manner that it may be bodily moved or reciprocated in the direction of the movement of the receiving surface.

According to this arrangement the mounting 27 is provided with a slide 32 engaging a guide piece 33 carried by the machine frame 34. A bearing member 35 is formed in one piece with the guide 33 and supports a driving shaft 36 having at one end a bevel wheel 37. This bevel wheel meshes with a bevel wheel 38 carried by a shaft 39 which runs in a bearing 40 rigidly attached to the guide piece 33 and in a bracket 40a depending from the mounting 27. A bevel wheel 41 which is splined to the shaft 39 so that it may move longitudinally of the shaft meshes with the bevel wheel 29 of the shaft 28 to which the cam disc 17 is attached.

The driving shaft 36 carries a cam disc 43 having a cam groove 44 adapted for engagement with a roller 45 carried by one arm of a bell crank lever 46 which is pivoted at 47 on the bearing piece 35. The other arm of this bell crank lever is slotted to engage a roller 49 which is mounted upon the casing 27 in a slot 50 so that it may be adjusted in the slot.

As the shaft 36 revolves by a chain drive connected to the sprocket 36a motion will be transmitted to the vertical shaft 28 of the cam disc 17 so as to impart the desired shaping movements to the nozzles 5, as explained with reference to Figures 1 and 2. At the same time, by the action of the cam disc 43, the bell crank 46 is pivoted and through the engagement of the roller 49 with the slot 48 the mounting 27 slides on the guide 33 and thus reciprocates in the direction of movement of the receiving surface 51, such movement being controlled by a suitable shaping of the cam 44. The extent of this movement may be varied by an adjustment of the roller 49 in the slot 48.

By such arrangement it will be appreciated that any desired shape of article may be deposited on the moving receiving surface or conveyor 51.

During the depositing the casing 27 will move forwardly at the same speed as the receiving surface and will return to its original position after the deposition of the articles is effected and extrusion is stopped, the return movement preferably being faster than the forward movement.

In order to break away the nozzles from the deposited pieces at the end of the depositing period the receiving surface 51 may be abruptly lowered (as indicated, for example, in Figure 1) by the provision of a rotary cam 54 mounted beneath the upper run of the conveyor. The necessary movement may be transmitted to the cam 54 by any known device such as a ratchet or like drive.

The breaking away movement of the nozzles may also be effected by raising the nozzles away from the receiving surface. Such an arrangement is shown in Figure 5 in which the nozzles are carried by levers 66 pivotally connected at 67 to brackets 68 carried by the nozzle plate 4.

The nozzles 5 are mounted upon mouth piece elements 64 which are connected by flexible tubes 65 with the nozzle plate 4 which is provided with pipes 4a.

Connecting rods 69 are pivoted at 70 to the levers 66 and carry at their lower end 71 rollers 72 which run on the rotary cam disc 54.

As the cam 54 is rotated to the position shown in Figure 5 the nozzles 5 will be lifted away from the receiving surface and thus break away from the deposited shape.

A similar result may be obtained by mounting the hopper 1 of the depositing machine so that it may be bodily lifted. Such an arrangement is indicated in Figure 6 in which the hopper 1 is pivoted to coupling rods 63 having rollers 62 engaging the lifting cam 54.

When the cam 54 is moved to the position shown in Figure 6 the depositing hopper 1 together with the nozzles 5 will be raised to break away the nozzles from the deposited shapes on the receiving surface.

It will be appreciated that the hopper is provided with intermittently operated means for extruding the material from the nozzles 5, such means being well known.

Referring now to Figures 7, 8 and 9, the depositing machine is provided with base members 74, 75, on which the machine or carriage 73 is carried by means of rollers 76, 77, 78 and 79 arranged on shafts 80 and 81, whereby the machine frame may be moved relatively to the base members, the latter constituting a cradle for the carriage.

The shafts 80 and 81 have keyed to them levers 82, 83 and 84, 85 respectively on which counter-weights are mounted.

Angular lever plates 93 and 94 are keyed to the shaft 80 and also to a shaft 86 which is mounted on bearings on the frame 73.

At its other end the frame 73 is provided with a shaft 87 to which a pair of links (one of which 83a is shown in Figure 7) is keyed, these links also being keyed to the shaft 81.

By this arrangement the machine frame with the depositor and other parts are counterbalanced by the counter-weights about the axes of the shafts 80 and 81.

On the machine frame 73 a main driving shaft 88 is provided which carries a cam 89. A roller carried by a lever 90 engages this cam, the lever being pivoted at 91 to the machine frame 73.

The lever 90 is also connected by an adjustable rod 92 with the plate 93 which is keyed to the shaft 80.

The lever 94 at the other end of the shaft 86 is connected by a rod 95 with a U-shaped lever 96 keyed on the shaft 87.

On rotation of the main driving shaft 88 the cam 89, by its engagement of the roller of the lever 90, causes a pivoting of the lever which is transmitted through the rod 92 to the plate 93.

The relative movement between the plate 93 and the frame 73 causes a rotation of the shaft 86 which is transmitted to the plate 94 on the opposite end of the shaft and through the rod 95 a corresponding rotary movement is imparted to the shaft 87 at the other end of the machine. Thus the frame 73 is either raised or lowered according to the position of the roller on the cam 89.

This raising of the frame 73 relatively to the receiving surface 51 causes a corresponding movement of the nozzles associated with the depositor 1 and is utilized to effect a breaking away of the nozzles from the deposited articles at the end of the depositing period. The adjustable rod 92 is threaded and engages a nut carried by the plate 93 so that the extent of the vertical movement of the machine may be varied by rotating the hand wheel 97.

The roller of the lever 90 may be adjusted to a position in which it will be out of engagement with the cam 89 in which case the frame of the machine will remain stationary in its raised position so that the machine can be converted to a machine in which the severance of the extruded material is effected by means of a wire passing across the nozzles in known manner.

For this purpose the lever 90 has pivoted thereto a rod 98 which passes through an aperture in a bracket 99 fixed upon the frame centre 93.

When the lever 90 is moved to disengage its roller from the cam 89, it is held by the engagement of a set screw or other fastening device 100 abutting against the bracket 99.

In order to provide a reciprocating movement to the machine to produce the supplementary movement of the nozzles in accordance with the travel of the receiving surface 51, a second cam 103 is provided on the main shaft 88 and is adapted to be engaged by a roller on a lever 101 pivoted at 102 upon the machine frame 73. The lower arm of the lever is provided with a slot in which a bolt 104 is adjustably mounted, said bolt being carried upon one end of a coupling rod 105, the other end of which is pivoted to the supports 74, 75.

As the shaft 88 revolves the lever 101 will be rocked and by the coupling rod 105 the machine will reciprocate in a horizontal direction by the wheels or rollers 76, 77, 78 and 79 running along their tracks on the frames 74, 75. The extent of this reciprocatory movement of the machine may be varied by adjusting the bolt 104 in the slotted arm of the lever 101.

The shape of the cam 103 is preferably such that the rate of the forward reciprocation agrees with the travel of the receiving surface 51, while the return movement is effected at a greater rate.

A tension spring 106, one end of which is connected to the frame 73 and the other end to the lever 101, is provided for holding the roller of the lever in engagement with the cam 103. Springs 107, 108, the ends of which are connected respectively to the frame 73 and supports 74, 75, will also tend to hold the roller of the lever 101 in engagement with the cam 103 and further to return the machine to the left as viewed in Figure 7.

It will be appreciated that the depositing device 1 carried by the frame 73 is provided with a controlling cam disc 17 as described with reference to Figure 1, which is carried by the mounting 27 and driven through the shaft 31 which is provided with a chain drive 109 from the main shaft 88.

In order to synchronize the movements of the machine with the travelling receiving surface 51 during the running of the machine, an adjustable change speed gear may be provided in the drive in known manner.

When utilizing the machine as a wire cut machine both the vertical rise of the machine frame 73 and the supplementary movement afforded by the cam 103 may be cut out.

Having now described my invention what I claim as new and desire to secure by Letters Patent is:—

1. A machine for depositing confectionery shapes upon a travelling surface, comprising a depositing machine having a nozzle or nozzles, means for intermittently extruding material from the nozzles, cam controlled means for moving the nozzles according to the shape of the deposited articles, a carriage supporting the depositing machine, counterweight levers pivoted to and supporting the carriage, cam controlled means for adjusting the angle of the counterweight levers with respect to the carriage for moving the carriage vertically relative to the receiving surface and cam controlled means for moving the carriage in accordance with the travel of the receiving surface.

2. A machine for depositing confectionery shapes upon a horizontal travelling surface, comprising a depositing mechanism including nozzles and means for extruding material from the nozzles upon the travelling surface, a carriage providing a mounting for the depositing mechanism, a cradle, yielding means supporting the carriage in the cradle, and means for moving the carriage vertically in the cradle to position the nozzles with relation to the travelling surface.

3. A machine for depositing confectionery shapes upon a horizontal travelling surface, comprising a depositing mechanism including nozzles and means for extruding material from the nozzles upon the travelling surface, a carriage providing a mounting for the depositing mechanism, a cradle, counterweight levers pivoted to the carriage and fulcrumed on the cradle to yieldingly support the carriage, and means for moving the carriage vertically in the cradle to position the nozzles with relation to the travelling surface.

4. A machine for depositing confectionery shapes upon a horizontal travelling surface, comprising a depositing mechanism including nozzles and means for extruding material from the nozzles upon the travelling surface, a carriage providing a mounting for the depositing mechanism, a cradle having horizontal tracks, shafts carried by wheels travelling on the horizontal tracks, counterweight levers pivoted to the carriage and fulcrumed on the wheeled shafts to yieldingly support the carriage, and means for moving the carriage vertically in the cradle to position the nozzles with relation to the travelling surface.

5. A machine for depositing confectionery shapes upon a horizontal travelling surface, comprising a depositing mechanism including nozzles and means for extruding material from the nozzles upon the travelling surface, a carriage providing a mounting for the depositing mechanism, a cradle having horizontal tracks, shafts carried by wheels travelling on the horizontal tracks, counterweight levers pivoted to the carriage and fulcrumed on the wheeled shafts to yieldingly support the carriage, angular levers pivoted at their angles to the carriage and journaled at one of their ends on one of the shafts, and operative means connected with the other ends of the angular levers to simultaneously turn said levers to move the carriage vertically to position the nozzles with relation to the travelling surface.

In testimony whereof I have signed my name to this specification.

ARIBERT KREMMLING.